United States Patent
Brewbaker et al.

(10) Patent No.: US 9,341,127 B2
(45) Date of Patent: May 17, 2016

(54) MULTIVARIABLE LOW-PRESSURE EXHAUST GAS RECIRCULATION CONTROL

(71) Applicant: Ford Global Technologies, LLC, Dearborn, MI (US)

(72) Inventors: Thomas Alan Brewbaker, Plymouth, MI (US); Michiel J. Van Nieuwstadt, Ann Arbor, MI (US)

(73) Assignee: Ford Global Technologies, LLC, Dearborn, MN (US)

( * ) Notice: Subject to any disclaimer, the term of this patent is extended or adjusted under 35 U.S.C. 154(b) by 74 days.

(21) Appl. No.: 14/298,701

(22) Filed: Jun. 6, 2014

(65) Prior Publication Data

US 2015/0354483 A1 Dec. 10, 2015

(51) Int. Cl.
*F02M 25/07* (2006.01)
*F02D 41/00* (2006.01)

(52) U.S. Cl.
CPC ........ *F02D 41/0077* (2013.01); *F02D 41/0007* (2013.01); *F02D 41/0047* (2013.01); *F02D 41/0072* (2013.01); *F02M 25/0709* (2013.01); *F02M 25/0754* (2013.01); *F02D 2041/0017* (2013.01)

(58) Field of Classification Search
CPC ............ F02D 41/0047; F02D 41/0072; F02D 2041/0017; F02M 25/0709; F02M 25/0754; Y02T 10/144
USPC ........................................................ 60/605.2
See application file for complete search history.

(56) References Cited

U.S. PATENT DOCUMENTS

| | | | |
|---|---|---|---|
| 5,791,319 A | 8/1998 | Friedrich et al. | |
| 6,112,729 A | 9/2000 | Barnes et al. | |
| 6,128,902 A | 10/2000 | Kolmanovsky et al. | |
| 6,606,981 B2 | 8/2003 | Itoyama | |
| 8,489,309 B2 | 7/2013 | Nakayama | |
| 8,555,864 B2 | 10/2013 | Nitzke et al. | |
| 2008/0022677 A1* | 1/2008 | Barbe et al. | 60/599 |
| 2013/0269662 A1* | 10/2013 | Kuhn et al. | 123/568.11 |
| 2014/0020665 A1* | 1/2014 | Yoshioka | 123/568.24 |

FOREIGN PATENT DOCUMENTS

EP 2128407 A1 * 12/2009 ............. F02M 25/07

* cited by examiner

*Primary Examiner* — Audrey K Bradley
(74) *Attorney, Agent, or Firm* — Julia Voutyras; Alleman Hall McCoy Russell & Tuttle LLP

(57) ABSTRACT

Methods and systems are provided for adjusting a LP-EGR valve and an LP intake throttle to provide a desired LP-EGR flow rate while maintaining a minimum differential pressure. In one example, a method for a turbocharged engine method comprises: responsive to a differential between intake and exhaust pressure below a threshold, adjusting a LP-EGR valve while adjusting a LP intake throttle to regulate a LP-EGR flow rate and the differential to respective setpoints; and responsive to the differential above the threshold, saturating the LP-EGR valve to minimize the differential while actuating the throttle to regulate the flow rate to its setpoint. In this way, control of the LP-EGR system may be more robust to disturbances at very low differential pressures, require less actuator movement, and increase fuel economy.

20 Claims, 8 Drawing Sheets

MULTIVARIABLE LOW-PRESSURE EXHAUST GAS RECIRCULATION CONTROL

BACKGROUND AND SUMMARY

Engine systems may utilize recirculation of exhaust gas from an engine exhaust system to an engine intake system, a process referred to as exhaust gas recirculation (EGR), to reduce regulated emissions. For example, a turbocharged engine system may include a low-pressure (LP) EGR system which recirculates exhaust gas from the exhaust system to the intake passage upstream of a turbocharger compressor. Accordingly, exhaust gas may be recirculated into a low-pressure air induction system upstream of the compressor, resulting in a compressed mixture of fresh intake air and EGR downstream of the compressor. An EGR valve may be controlled to achieve a desired intake air dilution, the desired intake air dilution based on engine operating conditions.

However, due to the small differential pressures inherent to LP-EGR loops, turbocharged engine systems may also include a LP intake throttle to increase the differential pressure such that higher EGR rates can be achieved. There are competing requirements that constrain the degree of throttling. On one hand, excessive throttling unnecessarily increases fuel consumption. On the other hand, too little throttling can cause the system to operate at particularly low differential pressures, which necessitates high control gains and thereby reduces the control system robustness to disturbances.

The inventors herein have recognized the above issue and have devised various approaches to address it. In particular, systems and methods for controlling an LP intake throttle and an LP-EGR valve are disclosed. In one example, a turbocharged engine method, comprises: responsive to a differential between intake and exhaust pressure below a threshold, adjusting a LP-EGR valve while adjusting a LP intake throttle to regulate a LP-EGR flow rate and the differential to respective setpoints; and responsive to the differential above the threshold, saturating the LP-EGR valve to minimize the differential while actuating the throttle to regulate the flow rate to its setpoint. In this way, control of the LP-EGR system may be more robust, require less actuator movement, and increase fuel economy.

In another example, a turbocharged engine method, comprises: responsive to a differential between intake and exhaust pressure below a threshold, adjusting a LP-EGR valve while adjusting a LP intake throttle to regulate a LP-EGR flow rate and the differential respectively to a flow setpoint and a differential setpoint; and responsive to the differential above the threshold, in a first mode saturating the LP-EGR valve to minimize the differential while actuating the throttle to regulate the flow rate to the flow setpoint, and in a second mode, saturating the intake throttle to minimize the differential while actuating the LP-EGR valve to regulate the flow rate to the flow setpoint. In this way, the control system may be more robust to disturbances at very low differential pressures and fuel consumption due to excessive throttling may be decreased.

In another example, an internal combustion engine system comprises: a turbocharger including a compressor connected to a turbine, the compressor in communication with an intake manifold of the engine and the turbine in communication with an exhaust manifold of the engine; a low-pressure (LP) exhaust gas recirculation (EGR) passage including an EGR valve and an intake throttle connecting the intake manifold and the exhaust manifold, said EGR valve responsive to an EGR valve control signal and said intake throttle responsive to an intake throttle control signal for regulating a flow rate into said intake manifold and a differential pressure in said LP-EGR passage; a controller configured with instructions stored in non-transitory memory that when executed, cause the controller to: generate a flow rate error based upon a reference flow rate and a measured flow rate; generate a differential pressure error based upon a reference differential pressure and a measured differential pressure; calculate a minimum and a maximum achievable flow rates; apply the minimum and the maximum achievable flow rates as anti-windup limits to a first proportional-integral controller; execute the first proportional-integral controller to generate an adjusted flow rate setpoint responsive to the flow rate error; calculate a minimum and a maximum achievable differential pressures responsive to the adjusted flow rate setpoint; apply the minimum and the maximum achievable differential pressures as anti-windup limits to a second proportional-integral controller; execute the second proportional-integral controller to generate an adjusted differential pressure setpoint responsive to the differential pressure error; execute a linearization controller to generate an EGR valve actuator position and a LP intake throttle actuator position responsive to the adjusted flow rate setpoint and the adjusted differential pressure setpoint; and actuate the EGR valve to the EGR valve actuator position and the LP intake throttle to the LP intake throttle actuator position. In this way, control of the LP-EGR valve and the LP intake throttle can automatically switch between a multivariable control mode that improves robustness at very low differential pressures and a chained-actuator control mode that minimizes fuel consumption.

The above advantages and other advantages, and features of the present description will be readily apparent from the following Detailed Description when taken alone or in connection with the accompanying drawings.

It should be understood that the summary above is provided to introduce in simplified form a selection of concepts that are further described in the detailed description. It is not meant to identify key or essential features of the claimed subject matter, the scope of which is defined uniquely by the claims that follow the detailed description. Furthermore, the claimed subject matter is not limited to implementations that solve any disadvantages noted above or in any part of this disclosure.

BRIEF DESCRIPTIONS OF THE DRAWINGS

DETAILED DESCRIPTION

Figure 1:
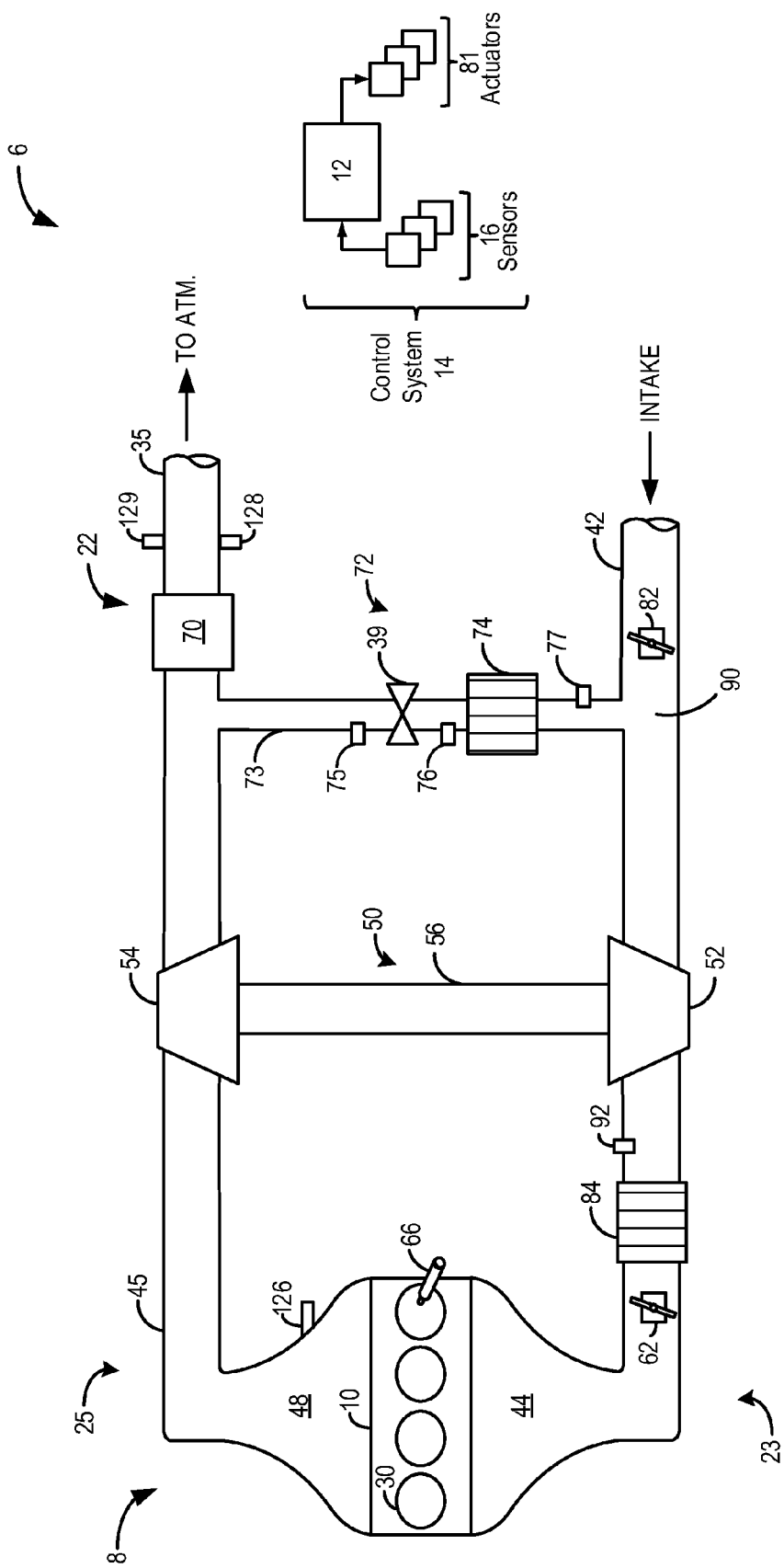
FIG. 1 shows a schematic depiction of an engine and an associated exhaust gas recirculation system.
Figure 2:
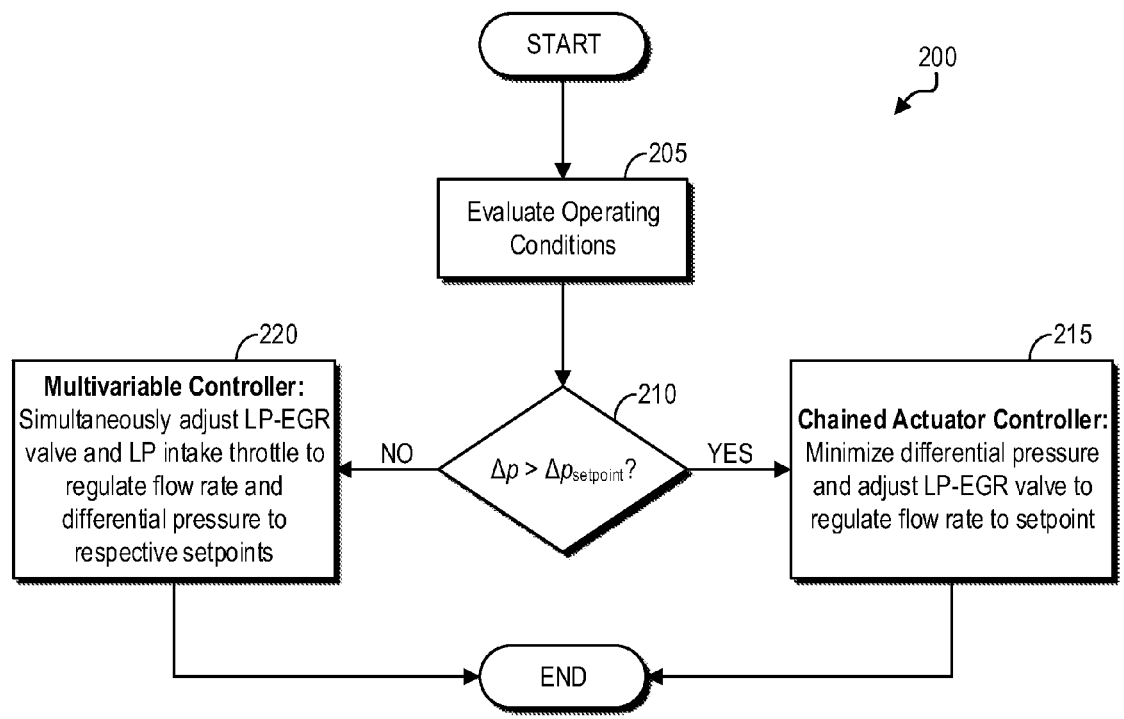
FIG. 2 shows a high-level flow chart illustrating a routine that may be implemented for performing LP-EGR valve and LP intake throttle adjustments responsive to the output of a differential pressure sensor.
Figure 3:
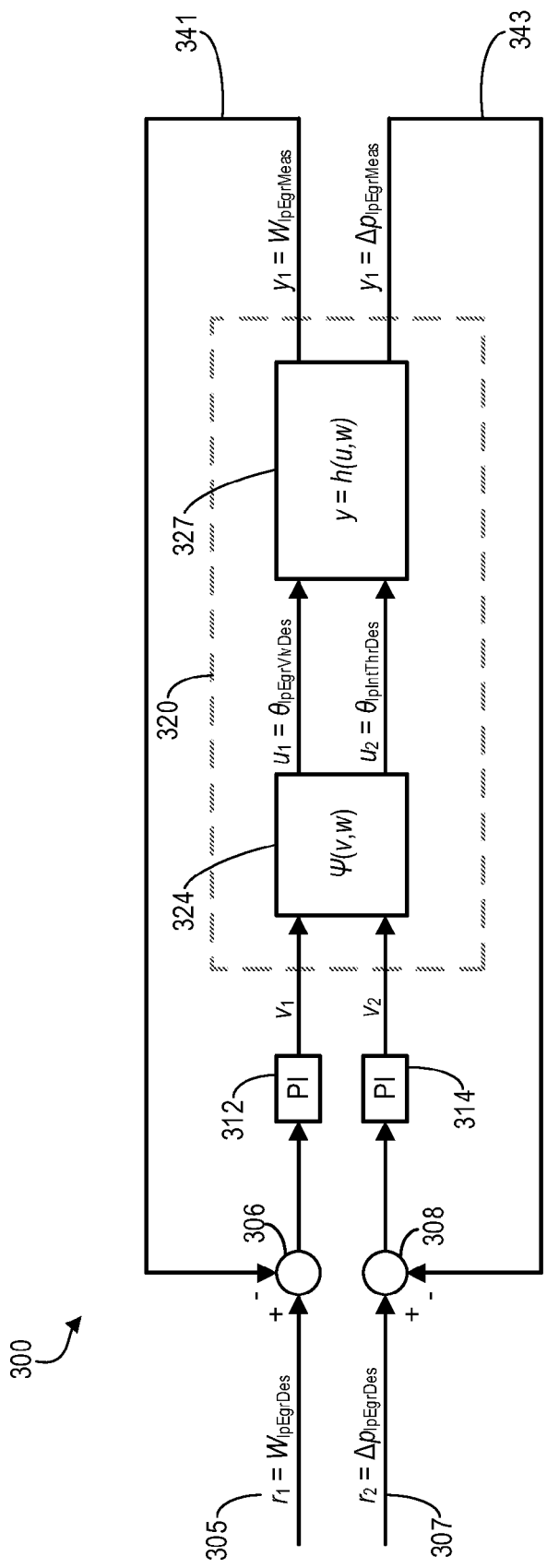
FIG. 3 shows a block diagram illustrating an example approach for LP-EGR control.
Figure 4:
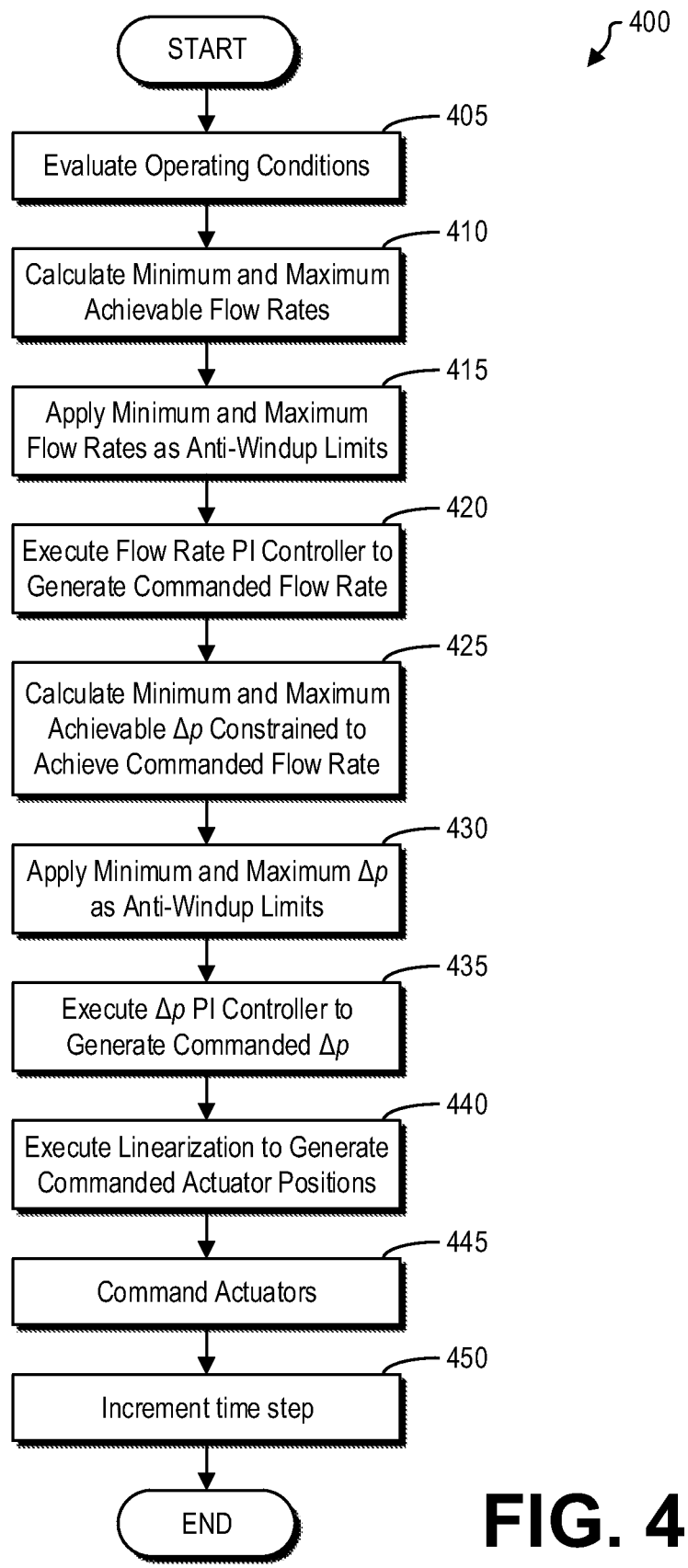
FIG. 4 shows a high-level flow chart illustrating a routine that may be implemented for performing LP-EGR valve and LP intake throttle adjustments responsive to a LP-EGR flow rate setpoint.
Figure 5:
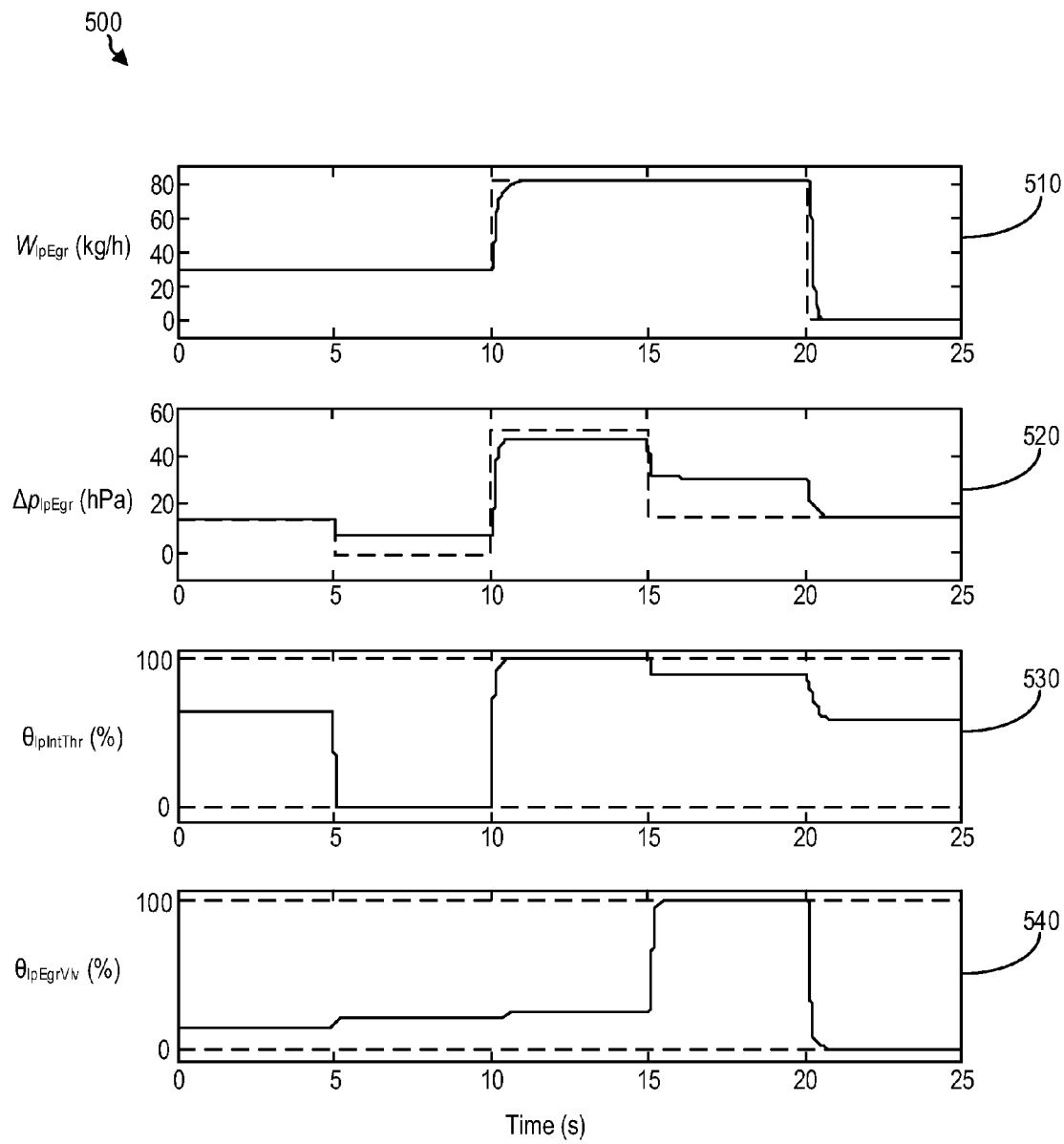
FIG. 5 shows a set of graphs illustrates a limitation strategy for four possible cases of a single-actuator saturation.
Figure 6:
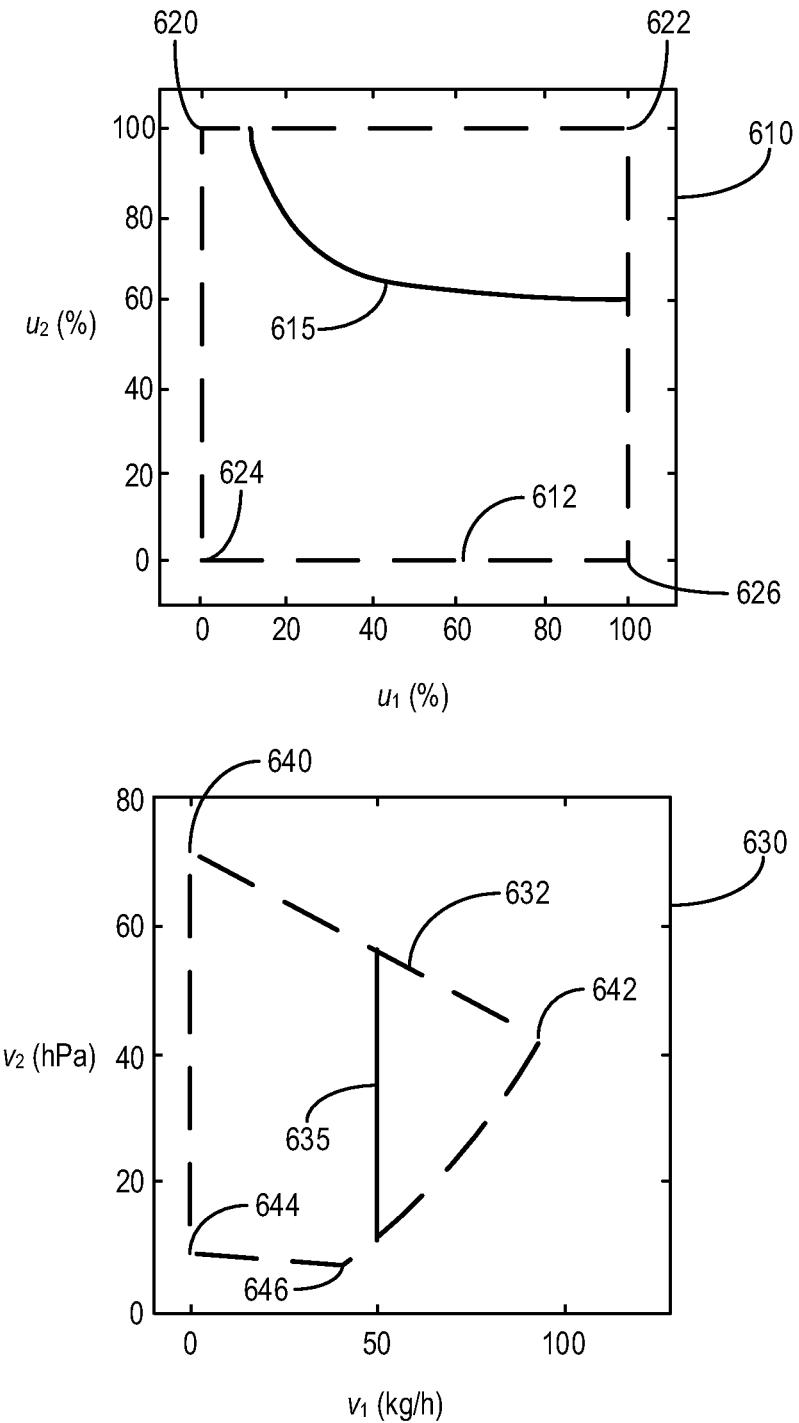
FIG. 6 shows a set of graphs illustrating a set of achievable LP-EGR valve positions and throttle positions and a corresponding set of achievable LP-EGR flow rates and differential pressures.
Figure 7:
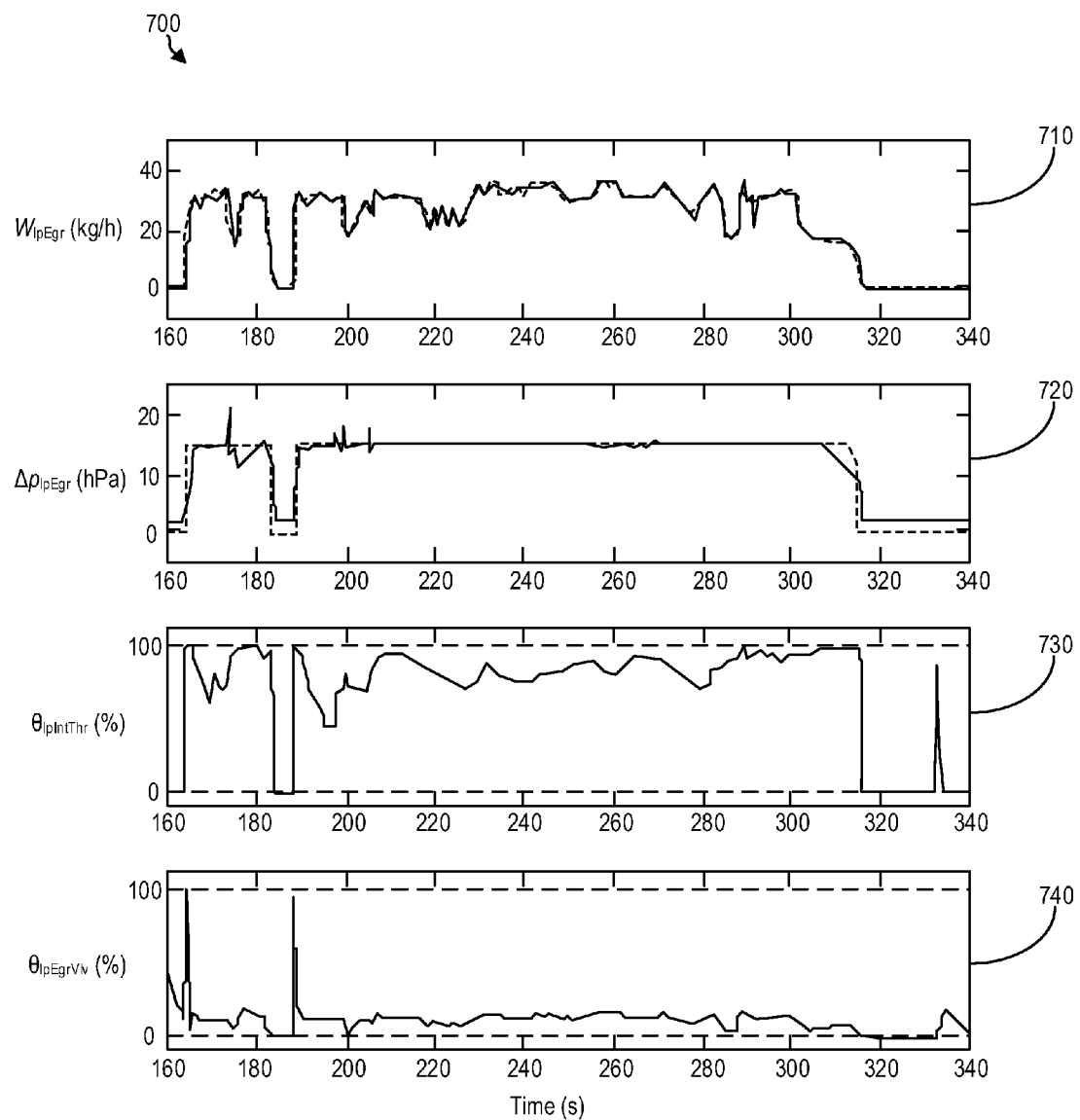
FIG. 7 shows a set of graphs illustrating a demonstration of a LP-EGR controller functioning as a multivariable controller.
Figure 8:
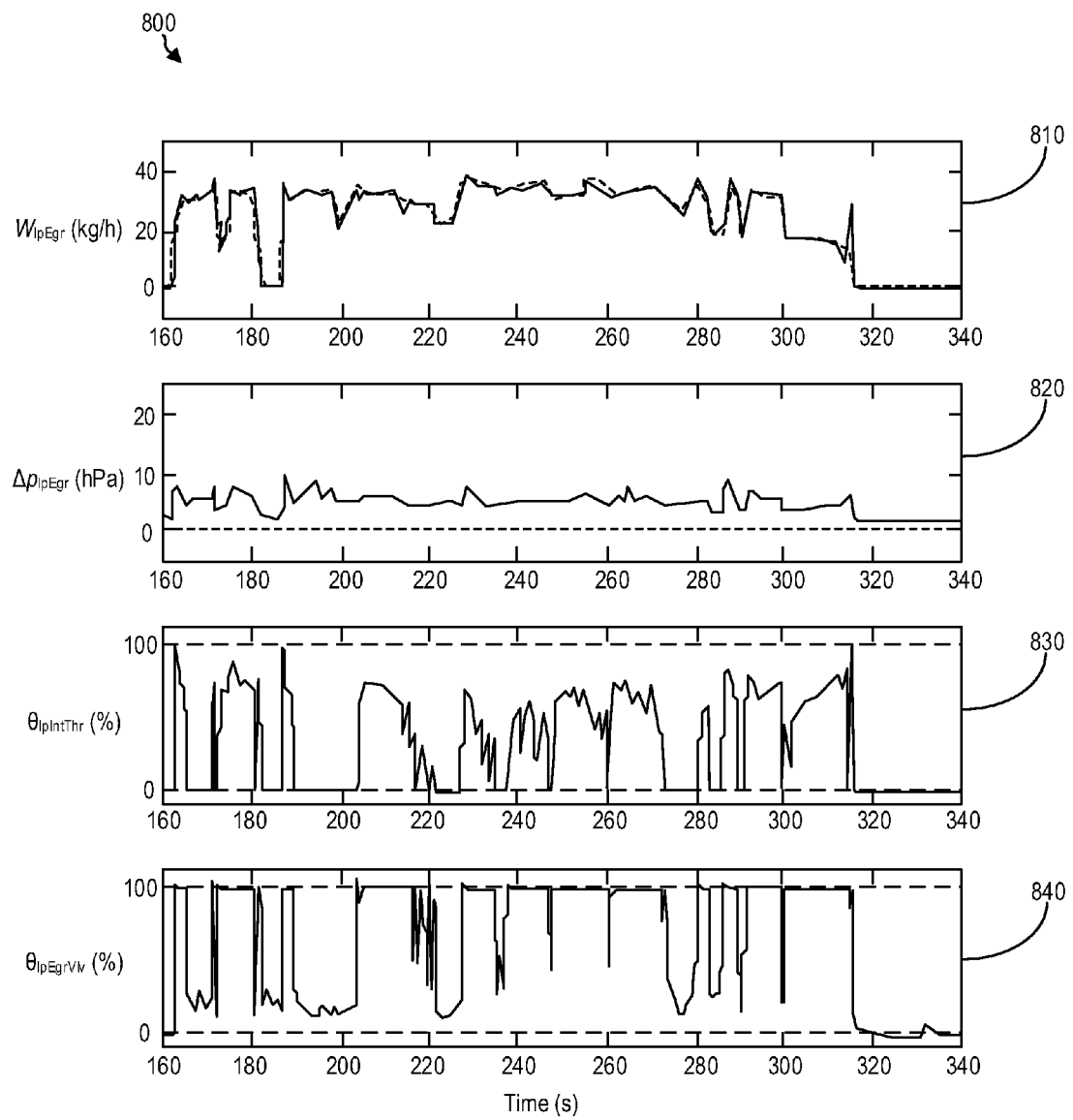
FIG. 8 shows a set of graphs illustrating a demonstration of a LP-EGR controller functioning as a chained-actuator controller.

The following description relates to a system and method for controlling low-pressure exhaust gas recirculation mass flow rate and differential pressure using a low-pressure exhaust gas recirculation valve and a low-pressure throttle. As shown in FIG. 1, a boosted engine may be configured with a low-pressure (LP) exhaust gas recirculation (EGR) system that may include an LP-EGR valve for adjusting an amount of exhaust gas recirculated to the engine intake as well as an LP intake throttle for adjusting the differential pressure across the LP-EGR valve. As shown in FIG. 2, control of the LP-EGR valve and the LP intake throttle may include a multi-variable mode and a chained-actuator mode depending on the differential pressure across the LP-EGR valve. As shown in FIG. 3, a controller enabling two such control modes may include a controller designed by input-output linearization in addition to two outer proportional-integral (PI) control loops. A limitation strategy for the PI controllers may include using the minimum and maximum achievable EGR flow rates and differential pressures as anti-windup limits, as shown in FIG. 4. This limitation strategy ensures that if one actuator saturates, the unsaturated actuator will prioritize tracking the EGR flow rate over the differential pressure, as shown in FIG. 5. The minimum and maximum achievable flow rates and differential pressures are constrained by the actuation ability of the system, as shown in FIG. 6. A demonstration that the disclosed system and methods exhibit a multivariable mode and a chained-actuator mode is shown in FIGS. 7 and 8.

FIG. 1 shows a schematic depiction of a vehicle system 6. The vehicle system 6 includes an engine system 8, including engine 10 coupled to emission control system 22. Engine 10 includes a plurality of cylinders 30. Engine 10 also includes an intake 23 and an exhaust 25. Intake 23 may receive fresh air from the atmosphere through intake passage 42. Intake passage 42 may include a first air intake throttle 82 configured to adjust the amount of fresh air that is received through intake passage 42. Intake 23 may further include a second main intake throttle 62 fluidly coupled to the engine intake manifold 44 via intake passage 42. Second intake throttle 62 may be positioned downstream of first intake throttle 82, and may be configured to adjust the flow of an intake gas stream entering engine intake manifold 44. Exhaust 25 includes an exhaust manifold 48 leading to an exhaust passage 45 that routes exhaust gas to the atmosphere via tailpipe 35.

Engine 10 may be a boosted engine including a boosting device, such as turbocharger 50. Turbocharger 50 may include a compressor 52, arranged along intake passage 42, and a turbine 54, arranged along exhaust passage 45. The amount of boost provided by the turbocharger may be varied by an engine controller. An optional charge after-cooler 84 may be included downstream of compressor 52 in the intake passage to reduce the temperature of the intake air compressed by the turbocharger. Specifically, after-cooler 84 may be included downstream of first intake throttle 82 and upstream of second intake throttle 62.

Emission control system 22, coupled to exhaust passage 45, may include one or more emission control devices 70 mounted in a close-coupled position in the exhaust. One or more emission control devices may include a particulate filter, SCR catalyst, three-way catalyst, lean NOx trap, oxidation catalyst, etc. The emission control devices may be positioned downstream of turbine 54 and upstream and/or downstream of LP-EGR path 73 in exhaust passage 45.

Engine 10 may further include one or more exhaust gas recirculation (EGR) passages for recirculating at least a portion of exhaust gas from exhaust passage 45 to intake passage 42. For example, the engine may include a low-pressure EGR (LP-EGR) system 72 with an LP-EGR passage 73 coupling the engine exhaust, downstream of turbine 54, to the engine intake, upstream of compressor 52. LP-EGR system 72 may be operated during conditions such as in the presence of turbocharger boost and/or when exhaust gas temperature is above a threshold. An EGR valve 39, positioned in LP-EGR passage 73 upstream of the compressor, may be configured to adjust an amount and/or rate of exhaust gas diverted through the EGR passage. LP-EGR passage 73 may further include an LP-EGR cooler 74 to lower the temperature of exhaust gas being recirculated into the engine intake. In this configuration, the EGR passage may be configured to provide low pressure EGR, and EGR valve 39 may be a LP-EGR valve. Further, first intake valve 82 may be referred to as a low-pressure (LP) intake throttle. In alternate embodiments, a high-pressure EGR (HP-EGR) system (not shown) may also be included wherein a HP-EGR passage may be configured to divert at least some exhaust gas from the engine exhaust, upstream of the turbine, to the engine intake, downstream of the compressor.

In some embodiments, one or more sensors may be positioned within LP-EGR passage 73 to provide an indication of one or more of a pressure, temperature, and air-fuel ratio of exhaust gas recirculated through the LP-EGR passage. For example, sensors 75 and 76 may be pressure sensors located upstream and downstream of LP-EGR valve 39. Exhaust gas diverted through LP-EGR passage 73 may be diluted with fresh intake air at mixing point 90, located at the junction of LP-EGR passage 73 and intake passage 42. Specifically, by adjusting EGR valve 39 in coordination with LP intake throttle 82 (positioned in the air intake passage of the engine intake, upstream of the compressor), a dilution of the EGR flow may be adjusted.

Engine 10 may be controlled at least partially by a control system 14 including controller 12 and by input from a vehicle operator via an input device (not shown). Control system 14 is configured to receive information from a plurality of sensors 16 (various examples of which are described herein) and sending control signals to a plurality of actuators 81. As one example, sensors 16 may include exhaust gas sensor 126 coupled to exhaust manifold 48, an exhaust temperature sensor 128 and exhaust pressure sensor 129 located downstream of the emission control device 70 in tailpipe 35, oxygen sensor 92 coupled upstream of main intake throttle 62, and various sensors in LP-EGR passage 73, such as pressure sensors 75 and 76 located upstream and downstream of the LP-EGR valve 39 and an EGR flow rate sensor 77. Various exhaust gas sensors may also be included in exhaust passage 45 downstream of emission control device 70, such as particulate matter (PM) sensors, NOx sensors, oxygen sensors, ammonia sensors, hydrocarbon sensors, etc. Other sensors such as additional pressure, temperature, air/fuel ratio and composition sensors may be coupled to various locations in the vehicle system 6. As another example, actuators 81 may include fuel injector 66, EGR valve 39, LP intake throttle 82, and main intake throttle 62. Other actuators, such as a variety of additional valves and throttles, may be coupled to various locations in vehicle system 6. Controller 12 may receive input data from the various sensors, process the input data, and trigger the actuators in response to the processed input data based on instruction or code programmed therein corresponding to one or more routines. For example, controller 12 may be configured to compute a differential pressure across the LP-EGR valve 39 by calculating the difference between input data received from pressure sensor 76 and pressure sensor 75. An example control routine is described herein with regard to FIG. 2.

FIG. 2 shows a high-level flow chart for an example method 200 for controlling a LP-EGR system in accordance with the current disclosure. In particular, method 200 relates to using two different control strategies responsive to a differential pressure across the LP-EGR valve 39. Method 200 will be described herein with reference to the components and systems depicted in FIG. 1, though it should be understood that the method may be applied to other systems without departing from the scope of this disclosure. Method 200 may be carried out by controller 12, and may be stored as executable instructions in non-transitory memory.

Method 200 may begin at 205. At 205, method 200 may include evaluating operating conditions. Operating conditions may include, but are not limited to, LP-EGR differential pressure, LP-EGR flow rate, LP-EGR valve position, LP intake throttle position, etc. Evaluating operating conditions may comprise receiving input data from various sensors and performing a computation using said input data. For example, the LP-EGR differential pressure across the LP-EGR valve 39 may be calculated by computing the difference between pressure data from pressure sensors 75 and 76. In the absence of pressure sensors 75 and 76, the LP-EGR differential pressure may be approximated from a pre-compressor gauge pressure measurement, e.g., $\Delta p_{lpEgrMeas} \approx p_{amb} - p_{cmprUs}$, which neglects the minor pressure drop across the exhaust tailpipe.

Continuing at 210, the differential pressure $\Delta p_{lpEgrMeas}$ across the LP-EGR valve 39 is compared to a LP-EGR differential pressure setpoint $\Delta p_{setpoint}$. The LP-EGR differential pressure setpoint $\Delta p_{setpoint}$ may be set to a low yet non-zero differential pressure, for example, 5 hectopascal (hPa). If the differential pressure $\Delta p_{lpEgrMeas}$ is greater than the differential setpoint $\Delta p_{setpoint}$, method 200 may continue to 215. At 215, the controller 12 may act as a chained-actuator controller. The controller 12 closes the LP intake throttle 82 to minimize the differential pressure, and then adjusts the LP-EGR valve 39 to regulate the LP-EGR flow rate to a LP-EGR flow rate setpoint $W_{lpEgr}$. This control strategy minimizes the fuel consumption due to LP-EGR pumping work. Method 200 may then end. Otherwise, if the differential pressure $\Delta p_{lpEgrMeas}$ is less than the differential setpoint $\Delta p_{setpoint}$, method 200 may continue to 220.

At 220, method 200 may act as a multivariable controller. The controller 12 simultaneously adjusts the LP-EGR valve 39 and the LP intake throttle 82 to regulate LP-EGR flow rate $W_{lpEgr}$ and differential pressure $\Delta p_{lpEgrMeas}$ to their respective setpoints. This control strategy allows the system to avoid large control gains and reduced control system robustness that occur at very low differential pressures. Method 200 may then end.

The control method 200 thus uses two control strategies responsive to the differential pressure with respect to the differential pressure setpoint. Using method 200, the controller 12 may automatically switch between functioning as a chained-actuator controller and a multivariable controller, each with its own advantages. An example approach to implementing method 200 is disclosed herein with regard to FIGS. 3 and 4.

FIG. 3 shows an example approach 300 for LP-EGR control. Example approach 300 is designed with an input-output linearization and proportional-integral control. Example approach 300 includes a steady-state virtual plant 320 and two outer loops with PI controllers 312 and 314.

Reference signal $r_1 = W_{lpEgrDes}$ 305 represents a reference desired LP-EGR flow rate, while reference signal $r_2 = \Delta p_{lpEgrDes}$ 307 represents a reference desired LP-EGR differential pressure. Feedback signal $y_1 = W_{lpEgrMeas}$ 341 represents the measured LP-EGR flow rate, while feedback signal $y_2 = \Delta p_{lpEgrMeas}$ 343 represents the measured LP-EGR differential pressure. Junction 306 computes the difference between reference signal 305 and feedback signal 341; this difference is the error associated with the LP-EGR flow rate. Junction 308 computes the difference between reference signal 307 and feedback signal 343; this difference is the error associated with the LP-EGR differential pressure.

Example approach 300 may include an outer loop PI controller 312 and an outer loop PI controller 314. Outer loop PI controller 312 generates an adjusted input $v_1 = W_{lpEgrDes}$ including a proportional gain term and an integral gain term for the error $r_1 - y_1$ computed at junction 306. Outer loop PI controller 314 similarly generates an adjusted input $v_2 = \Delta p_{lpEgrDes}$ including a proportional gain term and an integral gain term for the error $r_2 - y_2$ computed at junction 308. Outer loop PI controllers 312 and 314 provide zero steady-state tracking error and improve robustness to modeling errors in an inverse plant model $\Psi(v, w)$, discussed further herein. PI controllers 312 and 314 may be calibrated to yield a closed-loop time constant of approximately 150-200 ms for both loops.

Virtual plant 320 features a controller 324 and a plant model 327. Controller 324 uses the inputs $v_1$ and $v_2$ representing desired LP-EGR flow rate and LP-EGR differential pressure to determine the appropriate LP-EGR valve throttle position $u_1 = \theta_{lpEgrVlvDes}$ and LP intake throttle position $u_2 = \theta_{lpIntThrDes}$. Plant model 327 represents the physical LP-EGR system, and therefore is based on incompressible-flow orifice equations for the LP-intake throttle, LP-EGR path, and tailpipe, and the associated dynamics are attributed to sensors and actuators. The dynamics of Plant 327 are non-linear and multivariable:

$$\dot{x} = f(x, w) + Bu,$$

$$y = Cx,$$

and so an appropriate control law $\Psi(x, v, w)$ must be chosen to linearize and decouple the plant. However, the plant dynamics are fast relative to the time scale of the outer loops, with time constants of approximately 50 ms or less. Therefore, the high-bandwidth nature of the plant allows an assumption that the plant is always at steady-state, thereby eliminating a virtual feedback x, as shown by virtual plant 320. With this assumption, an input-output linearization of the virtual plant 320 is reduced to finding an algebraic inversion of the multivariable non-linear plant model. In the preferred embodiment, a unique solution representing controller 324 is given by:

$$u = \Psi(v, w) = \begin{bmatrix} \alpha_{lpEgr}^{-1} \left[ \dfrac{v_1}{\sqrt{2 v_2 w_2}} \right] \\ \alpha_{ais}^{-1} \left[ \dfrac{A_{tp}(w_1 - v_1)}{\sqrt{2 v_2 w_2 A_{tp}^2 - (w_1 - v_1 + w_3)}} \right] \end{bmatrix},$$

where $A_{tp}$ is the tailpipe area, $\alpha_{lpEgr}$ is the actuator position-to-area transfer function giving the effective area of the LP-EGR path $A_{lpEgr}$ (including LP-EGR passage 73, valve 39, and cooler 74), and $\alpha_{ais}$ is the actuator position-to-area transfer function giving the effective area of the air intake system $A_{ais}$ (including LP intake throttle 82). Note that the control inputs u, exogenous inputs w, and outputs y, are formally defined as:

$$u := \begin{pmatrix} \theta_{lpEgrVlvDes} \\ \theta_{lpIntThrDes} \end{pmatrix}, w := \begin{pmatrix} W_{cmpr} \\ \rho_{amb} \\ W_f \end{pmatrix}, y := \begin{pmatrix} W_{lpEgrMeas} \\ \Delta p_{lpEgrMeas} \end{pmatrix},$$

where $W_{cmpr}$ is the mass flow rate through the compressor, $\rho_{amb}$ is the density of ambient air, and $W_f$ is the mass flow rate of injected fuel.

In the preferred embodiment, the steady-state plant model 327 is modeled using a collection of incompressible-flow orifice equations and mass balances. Plant model 327 may be written simply as:

$$y = h(u,w) = [h_1(u,w) h_2(u,w)]^T,$$

where the functions $h_1(u,w)$ and $h_2(u,w)$ are given by:

$$h_1(u,w) = f_1[\alpha_{lpEgr}(u_1), \alpha_{ais}(u_2), A_{tp}, w_1, w_3],$$

$$h_2(u,w) = f_2[\alpha_{lpEgr}(u_1), \alpha_{ais}(u_2), A_{tp}, w_1, w_2, w_3].$$

Functions $f_1$ and $f_2$ may be obtained by solving a collection of three orifice equations and two mass conservation constraints. The three orifice equations used to model the gas flow through the LP-EGR passage 73, air-intake system 42, and tailpipe 35 are given by:

$$W_{lpEgr} = A_{lpEgr} \sqrt{2 \Delta p_{lpEgr} \rho_{amb}},$$

$$W_{ais} = A_{ais} \sqrt{2 \Delta p_{ais} \rho_{amb}},$$

$$W_{tp} = A_{tp} \sqrt{2 \Delta p_{tp} \rho_{amb}},$$

where the differential pressures are given by:

$$\Delta p_{lpEgr} = p_{lpEgrUs} - p_{cmprUs},$$

$$\Delta p_{ais} = p_{amb} - p_{cmprUs},$$

$$\Delta p_{tp} = p_{lpEgrUs} - p_{amb}.$$

Pressure $p_{lpEgrUs}$ refers to a pressure measured upstream of LP-EGR valve 39 while pressure $p_{cmprUs}$ refers to a pressure measured upstream of compressor 52. Mass conservation is enforced at the LP-EGR mixing point 90 and for the total mass entering the air path through the air-intake system 42 and exiting the air path through the tailpipe 35:

$$W_{cmpr} = W_{lpEgr} + W_{ais},$$

$$W_{tp} = W_{ais} + W_f.$$

Solving the above set of orifice flow and mass conservation equations for the LP-EGR flow rate $W_{lpEgr}$ and the LP-EGR differential pressure $\Delta p_{lpEgr}$ yields:

$$W_{lpEgr} = f_1(A_{lpEgr}, A_{ais}, A_{tp}, W_{cmpr}, W_f) =$$

$$\frac{A_{lpEgr}^2 A_{ais}^2 (W_{cmpr} + W_f) + A_{lpEgr}^2 A_{tp}^2 W_{cmpr} - A_{lpEgr} A_{ais} A_{tp} \sqrt{A_{ais}^2 (W_{cmpr} + W_f)^2 + A_{tp}^2 W_f^2 - A_{lpEgr}^2 W_f^2}}{A_{lpEgr}^2 A_{ais}^2 + A_{lpEgr}^2 A_{tp}^2 - A_{ais}^2 A_{tp}^2},$$

$$\Delta p_{lpEgr} = f_2(A_{lpEgr}, A_{ais}, A_{tp}, W_{cmpr}, W_f) =$$

$$\begin{cases} \left( \frac{W_{cmpr}^2}{A_{ais}^2} + \frac{(W_{cmpr} + W_f)^2}{A_{tp}^2} \right) \frac{1}{2\rho_{amb}}, & A_{lpEgr} = 0, \\ \frac{f_1(A_{lpEgr}, A_{ais}, A_{tp}, W_{cmpr}, W_f)^2}{2\rho_{amb} A_{lpEgr}^2}, & A_{lpEgr} > 0 \end{cases}$$

Those skilled in the art will appreciate that the multivariable static plant model 327 just described accurately models the behavior of the LP-EGR system. Furthermore, the linearized controller $\Psi(v,w)$ is specifically obtained from plant model 327 by determining an inverse function of $y = h(u,w)$ that maps y to u, given w, such that virtual plant 320 is linearized and decoupled:

$$y = h(u,w) = h(\Psi(v,w),w) = v.$$

Example approach 300 for LP-EGR control exhibits two distinctive control behaviors, described herein with regard to FIG. 2 and further described herein and with regard to FIGS. 5, 6, 7, and 8.

FIG. 4 shows a high-level flow chart illustrating an example control method 400 implemented by the controller described herein with regard to FIG. 3. In particular, method 400 comprises a PI control limitation strategy that prioritizes tracking the LP-EGR flow rate setpoint. That is, if either the LP-EGR valve or the LP intake throttle saturates, then the ability to simultaneously track the LP-EGR flow rate setpoint and the differential pressure setpoint is lost and priority is given to tracking the flow rate setpoint.

Method 400 may begin at 405. At 405, method 400 may include evaluating operating conditions. Evaluating operating conditions may include measuring the control inputs u, exogenous inputs w, and outputs y, as defined herein and with regard to FIG. 3. Method 400 may then continue to 410.

At 410, method 400 may include calculating minimum and maximum achievable LP-EGR flow rates. Calculating minimum and maximum achievable LP-EGR flow rates $v_1^{max}(k)$ and $v_2^{max}(k)$ may include evaluating, for example:

$$v_1^{max}(k) = h_1([u_1^{max} u_2^{max}]^T, w(k)),$$

$$v_1^{min}(k) = h_1([u_1^{min} u_2^{min}]_T, w(k)),$$

where k is the current time step. Example results of such a calculation are further discussed herein and with regard to FIG. 6. Method 400 may then continue to 415.

At 415, method 400 may include applying the minimum and maximum flow rates $v_1^{max}(k)$ and $v_2^{max}(k)$ as anti-windup limits on PI controller 312. Applying minimum and maximum flow rates as anti-windup limits on PI controller 312 restrains a subsequent PI commanded flow rate $v_1^*$ to the physically achievable LP-EGR flow rates, that is:

$$v_1^{min}(k) \leq v_1^* \leq v_1^{max}.$$

Method 400 may then continue to 420. At 420, method 400 may include executing the flow rate PI controller 312 to generate a commanded flow rate $v_1^*$. Method 400 may then continue to 425.

At 425, method 400 may include calculating minimum and maximum achievable differential pressures $\Delta p$ constrained to achieve the commanded flow rate. Calculating minimum and maximum achievable differential pressures $v_2^{min}(k)$ and $v_2^{max}(k)$ may include evaluating, for example:

$$v_2^{max}(k) = \max_{u \in S_u} \{h_2(u, w(k)) \mid h_1(u, w(k)) = v_1^*(k)\},$$

$$v_2^{min}(k) = \min_{u \in S_u} \{h_2(u, w(k)) \mid h_1(u, w(k)) = v_1^*(k)\},$$

where $S_u$ is the domain wherein the actuator positions are constrained, $$S_u = \{(u_1, u_2) | u_1^{min} \leq u_1 \leq u_1^{max}, u_2^{min} \leq u_2 \leq u_2^{max}\}.$$

In this way, the minimum and maximum achievable LP-EGR differential pressures are subject to the constraint of achieving the commanded LP-EGR flow rate $v_1(k)=v_1^*$. Example results of such a calculation are further discussed herein and with regard to FIG. 6. Method 400 may then continue to 430.

At 430, method 400 may include applying the minimum and maximum achievable differential pressures $\Delta p$ as anti-windup limits on PI controller 314. Applying the minimum and maximum achievable differential pressures as anti-windup limits on PI controller 314 restrains a subsequent PI commanded differential pressure $v_2^*$ to the physically achievable differential pressures, that is:

$$v_2^{min}(k) \leq v_2^* \leq v_2^{max}(k).$$

Method 400 may then continue to 435. At 435, method 400 may include executing the differential pressure PI controller to generate a commanded differential pressure $v_2^*$. Method 400 may then continue to 440.

At 440, method 400 may include executing a linearization to generate commanded actuator positions. Executing a linearization to generate commanded actuator positions may be carried out by controller 324 in accordance with the linearization scheme disclosed with regard to FIG. 3, such that:

$$u(k) = \Psi(v^*(k), w(k)); \; v^*(k) := \begin{pmatrix} v_1^* \\ v_2^* \end{pmatrix}.$$

Method 400 may then continue to 445. At 445, method 400 may include commanding the actuators to the generated commanded actuator positions. The generated commanded actuator positions are given by $u(k)$. Method 400 may then continue to 450. At 450, method 400 may include incrementing the timer by one step, for example, $k=k+1$. Method 400 may then end.

FIG. 5 shows a set of graphs 500 illustrating a limitation strategy for all four possible cases of single-actuator saturation in accordance with the current disclosure. Graph 510 shows a plot of the LP-EGR flow rate $W_{lpEgr}$ over time. The dashed line in graph 510 represents the LP-EGR flow rate setpoint, and the solid line represents the measured LP-EGR flow rate. Graph 520 shows a plot of the LP-EGR differential pressure $\Delta p_{lpEgr}$ over time. The dashed line in graph 520 represents the LP-EGR differential pressure setpoint, and the solid line represents the measured LP-EGR differential pressure. Graph 530 shows a plot of the LP intake throttle $\theta_{lpIntThr}$ over time. Graph 540 shows a plot of the LP-EGR valve position $\theta_{lpEgrVlv}$ over time.

From 0 seconds to 5 seconds, the LP intake throttle and the LP-EGR valve are both partially open, as shown in graphs 530 and 540. The measured LP-EGR flow rate and LP-EGR differential pressure are both close to their respective setpoints, as seen in graphs 510 and 520.

From 5 seconds to 10 seconds, the LP intake throttle actuator is saturated, as seen in graph 530. The LP intake throttle position $\theta_{lpIntThr}$ is at 0%, meaning that the LP intake throttle is fully open. In response to the LP intake throttle actuator saturation, the LP-EGR valve position increases as seen in graph 540. Graph 510 shows that during this time period, the measured LP-EGR flow rate is maintained near the setpoint. Meanwhile, graph 520 shows that the measured LP-EGR differential pressure $\Delta p_{lpEgr}$ is unable to reach the differential pressure setpoint.

From 10 seconds to 15 seconds, the LP intake throttle actuator is again saturated. However, in this case the LP intake throttle position $\theta_{lpIntThr}$ is at 100%, meaning that the LP intake throttle is fully closed. In response to the LP intake throttle actuator saturation, the LP-EGR valve position $\theta_{lpEgrVlv}$ increases. This increased LP-EGR valve position $\theta_{lpEgrVlv}$ maintains the measured LP-EGR flow rate $W_{lpEgr}$ very close to the flow rate setpoint. Meanwhile, the measured LP-EGR differential pressure $\Delta p_{lpEgr}$ is once again unable to reach the differential pressure setpoint.

From 15 seconds to 20 seconds, the LP-EGR valve actuator is saturated. The LP-EGR valve position $\theta_{lpEgrVlv}$ is at 100%, meaning that the LP-EGR valve is fully open. In response to the LP-EGR valve actuator saturation, the LP intake throttle position $\theta_{lpIntThr}$ slightly decreases. This decreased LP intake throttle position $\theta_{lpIntThr}$ maintains the measured LP-EGR flow rate $W_{lpEgr}$ very close to the flow rate setpoint. Meanwhile, the measured LP-EGR differential pressure $\Delta p_{lpEgr}$ is unable to reach the differential pressure setpoint.

From 20 seconds to 25 seconds, the LP-EGR valve actuator is again saturated. The LP-EGR flow rate $W_{lpEgr}$ is zero so the LP-EGR valve position $\theta_{lpEgrVlv}$ is at 0%, that is, the LP-EGR valve is fully closed to trivially achieve the flow rate setpoint. The LP intake throttle position $\theta_{lpIntThr}$ decreases in order to maintain the measured LP-EGR differential pressure $\Delta p_{lpEgr}$ at the differential pressure setpoint. This is the only case where an actuator is saturated while both setpoints are achieved.

In each case, the LP-EGR mass flow rate setpoint is tracked with zero steady-state error while a control error is present in the LP-EGR differential pressure. In the last case, the LP-EGR valve is fully closed while the LP intake throttle is partially open. This only occurs when the desired LP-EGR flow rate $W_{lpEgrDes}=0$ and the desired LP-EGR differential pressure $\Delta p_{lpEgrDes}$ is set larger than the unthrottled differential pressure, causing throttling while the LP-EGR valve is closed. This case is not useful during normal engine operation, and can be avoided by setting $\Delta p_{lpEgrDes}=0$ whenever $W_{lpEgrDes}=0$, thereby forcing the throttle fully open whenever the desired flow rate is zero. In this way, the multivariable controller can be forced to operate as a chained-actuator controller by intentionally setting the differential pressure setpoint unachievably low, for example $\Delta p_{lpEgrDes}=0$. In the preferred embodiment, the differential pressure setpoint $\Delta p_{lpEgrDes}=5$ hPa so that the controller operates as a chained-actuator controller when the differential pressure is above the setpoint, and resumes operation as a multivariable controller when the differential pressure is below the setpoint.

FIG. 6 shows an illustration of the set of achievable LP-EGR valve and throttle positions and corresponding LP-EGR flow rates and differential pressures in accordance with the current disclosure. The plots shown were created using the system and methods disclosed above with regard to FIGS. 3 and 4, assuming a compressor flow rate $W_{cmpr}=400$ kg/h and density of ambient air $\rho_{amb}=1.19$ kg/m$^3$.

Graph 610 shows the set of achievable LP-EGR valve positions $u_1$ and LP intake throttle positions $u_2$. The x-axis of graph 610 represents the LP-EGR valve position $u_1$ as an actuation percentage, where 0% corresponds to a fully closed valve and 100% corresponds to a fully opened valve. The y-axis of graph 610 represents the LP intake throttle position $u_2$ as an actuation percentage, where 0% corresponds to a fully open throttle and 100% corresponds to a fully closed throttle. The conventions are established by setting 0% to the un-energized actuator position, which for a diesel implementation, is open for the LP intake throttle and closed for the LP-EGR valve. Dashed line 612 encloses the full set of possible LP-EGR valve and throttle positions. Since the LP-EGR valve and the LP intake throttle are both able to change from fully closed to fully open, dashed line 612 encloses the entire configuration space. Dashed line 612 has four corners denoted by points 620, 622, 624, and 626. Point 620 corresponds to a fully closed LP intake throttle and a fully closed LP-EGR valve. Point 622 corresponds to a fully closed LP intake throttle and a fully open LP-EGR valve. Point 624 corresponds to a fully open LP intake throttle and a fully closed LP-EGR valve. Point 626 corresponds to a fully open LP intake throttle and a fully open LP-EGR valve.

Graph 630 shows the set of achievable LP-EGR flow rates $v_1$ and LP-EGR differential pressures $v_2$. The x-axis of graph 630 represents the LP-EGR flow rate in units of kilograms per hour. The y-axis of graph 630 represents the LP-EGR differential pressure in units of hectopascals. Dashed line 632 encloses the full set of possible LP-EGR flow rates and differential pressures achievable by the present invention. Dashed line 632 has four corners denoted by points 640, 642, 644, and 646. Each corner of dashed line 632 corresponds to a corner of dashed line 612 in graph 610. For example, point 640 corresponds to point 620, meaning that when the LP-intake throttle is fully closed and the LP-EGR valve is fully closed, the LP-EGR flow rate $v_1$=0 kg/h and the LP-EGR flow rate $v_2 \approx 70$ hPa. Similarly, point 642 corresponds to the actuator positions given by point 622, point 644 corresponds to the actuator positions given by point 624, and point 646 corresponds to the actuator positions given by point 626.

Since the PI limitation strategy disclosed herein and with regard to FIG. 4 prioritizes tracking the LP-EGR flow rate over the LP-EGR differential pressure, it is instructive to consider the range of actuator positions and differential pressures for a desired LP-EGR flow rate $v_1^*$. For example, solid line 615 in graph 610 is the subset of actuator positions corresponding to a desired LP-EGR flow rate $v_1^*$=50 kg/h. Solid line 635 graph 630 is the subset of achievable differential pressures given the constraint of achieving a desired LP-EGR flow rate $v_1^*$=50 kg/h. The minimum LP-EGR differential pressure $v_2^{min}$=12 hPa occurs when the LP-EGR valve position is $u_1$=100% and the LP intake throttle positions is $u_2$=60%. The maximum LP-EGR differential pressure $v_2^{max}$=56 hPa occurs when the LP intake throttle position is $u_2$=100% and the LP-EGR valve position is $u_1 \approx 12$%. Therefore, to minimize the differential pressure $v_2$ while achieving the desired LP-EGR flow rate $v_1^*$, the LP-EGR valve actuator must first saturate and then LP intake throttle actuator can track the flow rate. In this way, the controller may function as a chained-actuator controller.

FIG. 7 shows a set of graphs 700 illustrating the LP-EGR controller functioning as a multivariable controller during a Federal Test Procedure (FTP75) drive cycle in accordance with the current disclosure. In particular, the set of graphs 700 show a portion of the FTP75 drive cycle corresponding to the second vehicle-speed "hill" during the hot phase of the drive cycle.

Graph 710 shows a LP-EGR flow rate $W_{lpEgr}$ over time. The dashed line in graph 710 represents the LP-EGR flow rate setpoint $W_{lpEgrDes}$, while the solid line represents the measured LP-EGR flow rate $W_{lpEgrMeas}$. Graph 720 shows a LP-EGR differential pressure $\Delta p_{lpEgr}$ over time. The dashed line in graph 720 represents the LP-EGR differential pressure setpoint $\Delta p_{lpEgrDes}$, while the solid line represents the measured LP-EGR differential pressure $\Delta p_{lpEgrMeas}$. The desired LP-EGR differential pressure $\Delta p_{lpEgrDes}$=15 hPa, with the exception of $\Delta p_{lpEgrDes}$=0 hPa when the desired LP-EGR flow rate $W_{lpEgrDes}$=0 kg/h. Graph 730 shows a measured LP intake throttle position $\theta_{lpIntThr}$ over time. The LP intake throttle position $\theta_{lpIntThr}$ is shown as a percentage ranging from 0% to 100%, that is, fully open to fully closed. Graph 740 shows a measured LP-EGR valve position $\theta_{lpEgrVlv}$ over time. The LP-EGR valve position $\theta_{lpEgrVlv}$ is shown as a percentage ranging from 0% to 100%, that is, fully closed to fully open.

Graph 710 shows a strong correlation between the measured LP-EGR flow rate and the desired LP-EGR flow rate. The root-mean-square (RMS) LP-EGR flow rate control error is 2.1 kg/h. Graph 720 shows a strong correlation between the measured LP-EGR differential pressure and the desired LP-EGR differential pressure. The measured LP-EGR differential pressure is unable to achieve the LP-EGR differential pressure setpoint when the setpoint is zero, though the measured LP-EGR differential pressure is minimized as both actuators are saturated.

Graphs 730 and 740 illustrate the multivariable control behavior of the LP intake throttle 82 and the LP-EGR valve 39. Graph 730 shows that the LP intake throttle is mostly closed for the majority of the cycle and fully opens when the LP-EGR flow rate and differential pressure setpoints equal zero. The RMS LP intake throttle position variation is 4.4%. Meanwhile, the LP-EGR valve is mostly closed for the majority of the cycle and fully closes when the LP-EGR flow rate and differential pressure setpoints equal zero. The RMS LP-EGR valve position variation is 3.6%. These RMS values for LP-EGR flow rate control error and actuator position variation are only significant in comparison to other results, and so will be discussed further herein and with regard to FIG. 8.

FIG. 8 shows a set of graphs 800 illustrating the LP-EGR controller functioning as a chained-actuator controller during a Federal Test Procedure (FTP75) drive cycle in accordance with the current disclosure. In particular, the set of graphs 800 show a portion of the FTP75 drive cycle corresponding to the second vehicle-speed "hill" during the hot phase of the drive cycle.

Graph 810 shows a LP-EGR flow rate $W_{lpEgr}$ over time. The dashed line in graph 810 represents a LP-EGR flow rate setpoint $W_{lpEgrDes}$, while the solid line represents a measured LP-EGR flow rate $W_{lpEgrMeas}$. The LP-EGR flow rate setpoint trajectory in graph 810 is identical to the LP-EGR flow rate setpoint trajectory in graph 710 of FIG. 7. Graph 820 shows a LP-EGR differential pressure $\Delta p_{lpEgr}$ over time. The dashed line in graph 820 represents a LP-EGR differential pressure setpoint $\Delta p_{lpEgrDes}$ while the solid line represents a measured LP-EGR differential pressure $\Delta p_{lpEgrMeas}$. The desired LP-EGR differential pressure $\Delta p_{lpEgrDes}$=0 hPa throughout the cycle. Graph 830 shows a measured LP intake throttle position $\theta_{lpIntThr}$ over time. The LP intake throttle position $\theta_{lpIntThr}$ is shown as a percentage ranging from 0% to 100%, that is, fully open to fully closed. Graph 840 shows a measured LP-EGR valve position $\theta_{lpEgrVlv}$ over time. The LP-EGR valve position $\theta_{lpEgrVlv}$ is shown as a percentage ranging from 0% to 100%, that is, fully closed to fully open.

Graph 810 shows a strong correlation between the measured LP-EGR flow rate and the desired LP-EGR flow rate. The RMS LP-EGR flow rate control error is 2.9 kg/h. Graph 820 shows that the measured LP-EGR differential pressure $\Delta p_{lpEgrMeas}$ is unable to reach the LP-EGR differential pressure setpoint $\Delta p_{lpEgrDes}$=0, as expected, though the measured LP-EGR differential pressure is roughly minimized about 5 hPa.

Graphs 830 and 840 illustrate the chained-actuator behavior of the LP-EGR valve 39 and LP intake throttle 82. At least one of the actuators is saturated at all times during the cycle. When one actuator saturates, the unsaturated actuator is responsible for tracking the LP-EGR flow rate to the setpoint.

Consequently, the RMS LP-EGR valve position variation is 5.7% and the RMS LP intake throttle position variation is 4.7%. That is, there is increased actuator variation compared to the multivariable controller results shown in FIG. 7. The increased actuator variation for the chained-actuator control follows physical intuition. Given lower LP-EGR differential pressures, the LP-EGR valve requires larger magnitude movements to affect equivalent flow rate changes.

The chained-actuator controller minimizes the LP-EGR differential pressure $\Delta p_{lpEgr}$ at the expense of a higher LP-EGR flow rate $W_{lpEgr}$ control error and increased actuator variation compared to the multivariable controller.

In the preferred embodiment, the LP-EGR differential pressure setpoint is used as a minimum floor value. That is, the LP-EGR differential pressure setpoint $\Delta p_{lpEgrDes}$ can be set to a very low value, for example $\Delta p_{lpEgrDes}$=5 hPa, in order to avoid the reduced robustness in the immediate neighborhood of the singularity at $\Delta p_{lpEgr}$=0 hPa in the inverse plant model. In this manner, if the differential pressure is below 5 hPa, then the controller will behave as the multivariable controller and maintain the differential pressure at 5 hPa while tracking the LP-EGR flow rate setpoint. However, if the differential pressure is above 5 hPa, then the controller will operate as the chained-actuator controller, which minimizes the differential pressure necessary to achieve the LP-EGR flow rate, and correspondingly minimizes the marginal fuel consumption due to the LP-EGR pumping work.

Note that the example control and estimation routines included herein can be used with various engines and/or vehicle system configurations. The control methods and routines disclosed herein may be stored as executable instructions in non-transitory memory. The specific routines described herein may represent one or more of any number of processing strategies such as event-driven, interrupt-driven, multi-tasking, multi-threading, and the like. As such, various actions, operations, and/or functions illustrated may be performed in the sequence illustrated, in parallel, or in some cases omitted. Likewise, the order of processing is not necessarily required to achieve the features and advantages of the example embodiments described herein, but is provided for ease of illustration and description. One or more of the illustrated actions, operations and/or functions may be repeatedly performed depending on the particular strategy being used. Further, the described actions, operations and/or functions may graphically represent code to be programmed into non-transitory memory of the computer readable storage medium in the engine control system.

It will be appreciated that the configurations and routines disclosed herein are exemplary in nature, and that these specific embodiments are not to be considered in a limiting sense, because numerous variations are possible. For example, the above technology can be applied to V-6, I-4, I-6, V-12, opposed 4, and other engine types. The subject matter of the present disclosure includes all novel and non-obvious combinations and sub-combinations of the various systems and configurations, and other features, functions, and/or properties disclosed herein.

The following claims particularly point out certain combinations and sub-combinations regarded as novel and non-obvious. These claims may refer to "an" element or "a first" element or the equivalent thereof. Such claims should be understood to include incorporation of one or more such elements, neither requiring nor excluding two or more such elements. Other combinations and sub-combinations of the disclosed features, functions, elements, and/or properties may be claimed through amendment of the present claims or through presentation of new claims in this or a related application. Such claims, whether broader, narrower, equal, or different in scope to the original claims, also are regarded as included within the subject matter of the present disclosure.

The invention claimed is:

1. A method for a turbocharged engine, comprising:
responsive to a differential between intake and exhaust pressure below a threshold, adjusting a LP-EGR valve while adjusting a LP intake throttle to regulate a LP-EGR flow rate and the differential to respective setpoints; and
responsive to the differential above the threshold, one of fully opening and fully closing the LP-EGR valve to minimize the differential while actuating the throttle to regulate the flow rate to its setpoint.

2. The method of claim 1, wherein regulating the LP-EGR flow rate to the flow rate setpoint is prioritized over regulating the differential to the differential setpoint.

3. The method of claim 1, wherein the threshold is 5 hectopascals.

4. The method of claim 1, wherein the flow rate setpoint is based upon engine operating conditions.

5. The method of claim 1, wherein the differential setpoint is equivalent to the threshold.

6. The method of claim 1, wherein the flow rate is measured downstream of the LP-EGR valve.

7. The method of claim 1, further comprising using a pair of proportional-integral controllers and a linearization controller to control the LP intake throttle and the LP-EGR valve.

8. The method of claim 7, wherein the linearization controller is based on a physics-based model of the LP-EGR system, the physics-based model based on assumptions of an incompressible exhaust gas and steady-state dynamics of the LP-EGR valve and the LP intake throttle.

9. The method of claim 1, wherein the turbocharged engine includes an EGR passage, and the EGR passage couples an engine exhaust, downstream of a turbine, to an engine intake, upstream of a compressor.

10. The method of claim 9, wherein the LP-EGR valve is positioned in the EGR passage upstream of the compressor, and wherein the LP intake throttle is positioned in an air intake passage of the engine intake upstream of the compressor.

11. A turbocharged engine method, comprising:
responsive to a differential between intake and exhaust pressure below a threshold, adjusting a LP-EGR valve while adjusting a LP intake throttle to regulate a LP-EGR flow rate and the differential respectively to a flow setpoint and a differential setpoint; and
responsive to the differential above the threshold, in a first mode, one of fully opening and fully closing the LP-EGR valve to minimize the differential while actuating the throttle to regulate the flow rate to the flow setpoint, and in a second mode, one of fully opening and fully closing the intake throttle to minimize the differential while actuating the LP-EGR valve to regulate the flow rate to the flow setpoint.

12. The method of claim 11, wherein regulating the LP-EGR flow rate to the flow setpoint is prioritized over regulating the differential to the differential setpoint.

13. The method of claim 11, wherein the flow rate is measured downstream of the LP-EGR valve.

14. The method of claim 11, wherein the differential setpoint is equivalent to the threshold.

15. The method of claim 11, wherein the threshold is 5 hectopascals.

16. The method of claim 11, wherein the flow setpoint is based upon an engine operating condition.

17. The method of claim 11, further comprising using a pair of proportional-integral controllers and a linearization controller to control the LP intake throttle and the LP-EGR valve.

18. The method of claim 17, wherein the linearization controller is based on a physics-based model of the LP-EGR system, the physics-based model based on assumptions of an incompressible exhaust gas and steady-state dynamics of the LP-EGR valve and the LP intake throttle.

19. An internal combustion engine system comprising:
   an engine;
   a turbocharger including a compressor connected to a turbine, the compressor in communication with an intake manifold of the engine and the turbine in communication with an exhaust manifold of the engine;
   a low-pressure (LP) exhaust gas recirculation (EGR) passage including an EGR valve and an intake throttle connecting the intake manifold and the exhaust manifold, said EGR valve responsive to an EGR valve control signal and said intake throttle responsive to an intake throttle control signal for regulating a flow rate into said intake manifold and a differential pressure in said LP-EGR passage;
   a controller configured with instructions stored in non-transitory memory that when executed, cause the controller to:
      generate a flow rate error based upon a reference flow rate and a measured flow rate;
      generate a differential pressure error based upon a reference differential pressure and a measured differential pressure;
      calculate a minimum and a maximum achievable flow rate;
      apply the minimum and the maximum achievable flow rates as anti-windup limits to a first proportional-integral controller;
      execute the first proportional-integral controller to generate an adjusted flow rate setpoint responsive to the flow rate error;
      calculate a minimum and a maximum achievable differential pressure responsive to the adjusted flow rate setpoint;
      apply the minimum and the maximum achievable differential pressures as anti-windup limits to a second proportional-integral controller;
      execute the second proportional-integral controller to generate an adjusted differential pressure setpoint responsive to the differential pressure error;
      execute a linearization controller to generate an EGR valve actuator position and a LP intake throttle actuator position responsive to the adjusted flow rate setpoint and the adjusted differential pressure setpoint; and
      actuate the EGR valve to the EGR valve actuator position and the intake throttle to the LP intake throttle actuator position.

20. The system of claim 19, wherein the linearization controller is based on a physics-based model of the LP-EGR system, the physics-based model based on assumptions of an incompressible exhaust gas and steady-state dynamics of the EGR valve actuator and the LP intake throttle actuator.

* * * * *